Sept. 22, 1925.  
E. Q. MOSES  
1,554,752

SAFETY BRAKE OPERATING MECHANISM

Filed April 20, 1921  2 Sheets-Sheet 1

INVENTOR

ATTORNEYS

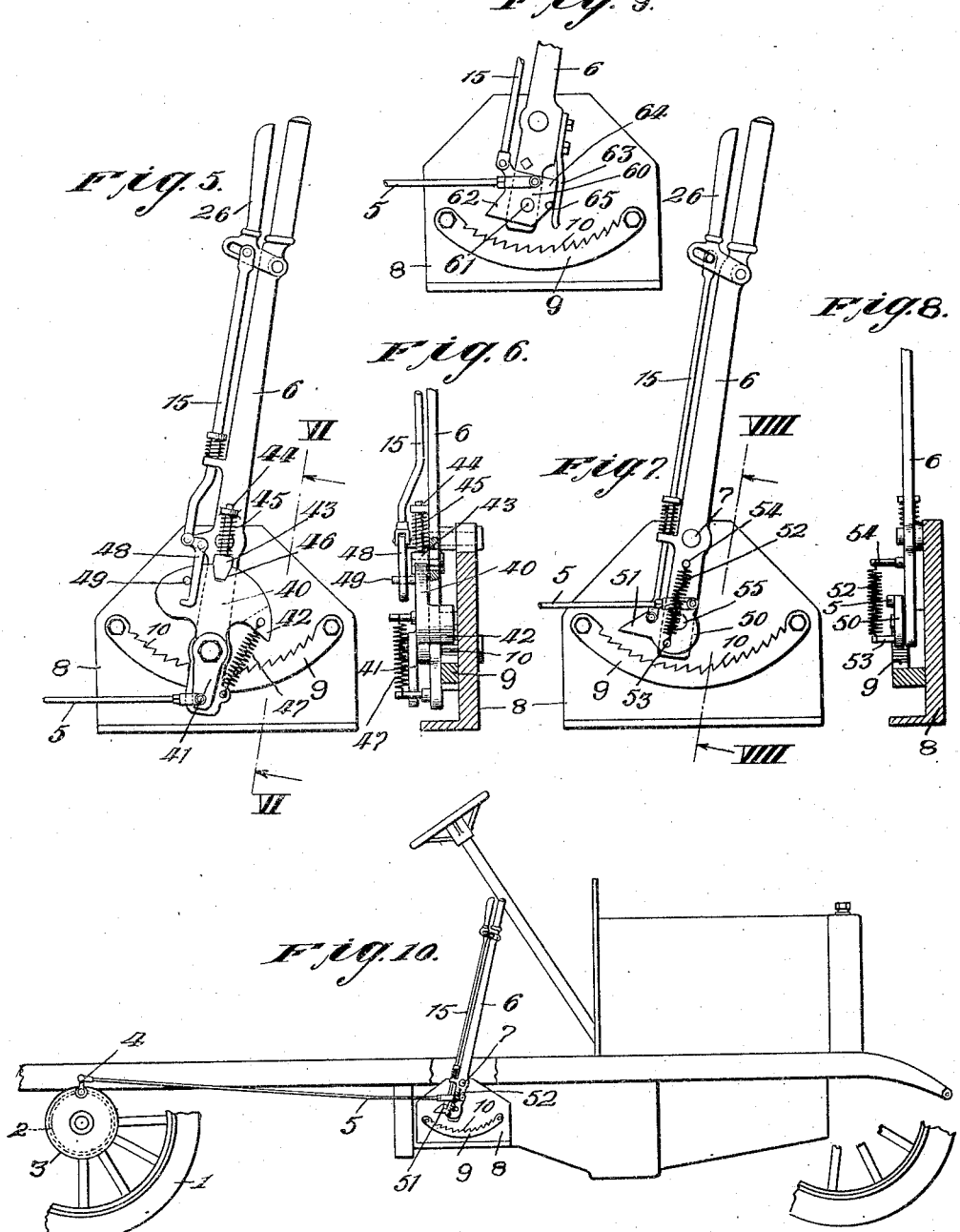

Patented Sept. 22, 1925.

1,554,752

UNITED STATES PATENT OFFICE.

EDMUND QUINCY MOSES, OF NEW YORK, N. Y.

SAFETY BRAKE-OPERATING MECHANISM.

Application filed April 20, 1921. Serial No. 463,067.

*To all whom it may concern:*

Be it known that I, EDMUND QUINCY MOSES, a citizen of the United States, and a resident of the city, county, and State of New York, have invented certain new and useful Improvements in Safety Brake-Operating Mechanism, of which the following is a specification.

This invention relates to operating mechanism for brakes, and especially for vehicle brakes. It is well known that practically all motor vehicles and some other vehicles are provided with, what are commonly termed, "emergency" brakes, and one of the important functions of these brakes is for locking the car stationary when not in use, particularly when a car is standing on a grade. For locking the brakes in applied position, mechanism is provided, usually some form of pawl and ratchet mechanism, associated with the brake applying lever.

When the vehicle is standing on a grade, it is necessary to pull the lever with sufficient force to apply the brake so tightly that accidental movement of the vehicle is impossible, the pawl and ratchet mechanism being intended to hold the lever in this position. Many accidents, however, have occurred by reason of the failure of the brake to be applied with sufficient force to positively prevent movement of the vehicle.

In such cases, owing to vibration, or an accidental push given to the vehicle or from other causes, the vehicle may start to roll down the grade, sometimes with disastrous results. The failure of the brakes to hold usually occurs from carelessness on part of the operator when applying the brake, insufficient force being utilized to apply the brake tightly. The danger of the brake slipping after it has seemingly been applied in such a way as to hold the car, may also be due to the cooling off of the brake band and drum, previously heated by friction, in such a way as to decrease the holding power of the brake, thereby permitting the vehicle to start.

The primary object of the present invention is to insure that the brake shall be initially applied with a force adequate to insure the maintenance of the braking effect, so as to positively lock the vehicle against accidental movement. In the constructions illustrated, this is accomplished by utilizing mechanisms of such character that the brake cannot be held in applied position unless sufficient force has been utilized to apply it properly.

Another object of the invention is to provide a construction which will minimize the danger of dragging brakes. This is accomplished by the present invention because the brake locking mechanism in preferred form will not operate to hold the brake partly applied, but is so arranged that when the brake is once released it will be completely released and not held in an intermediate position; in other words, the brake will be either locked in fully applied position in which the car cannot be driven, or the brake will be completely released, so that there will be no dragging. The danger of the brake jumping into partly applied position, owing to the vehicle striking an obstruction in the road as occurs in some vehicles, is also eliminated.

In the accompanying drawings, in which I have shown some preferred embodiments of my invention, Figure 1 is a side elevation showing a brake applying lever and mounting, illustrating one mode of application of the invention.

Figure 5 is a view similar to Figures 1 and 2, illustrating another embodiment of the invention.

Figure 6 is a section on line VI—VI of Figure 5.

Figure 7 is a view of another modified construction.

Figure 8 is a section on line VIII—VIII of Figure 7.

Figure 9 is a view illustrating another modified construction.

Figure 10 is a diagrammatic view of an automobile chassis, showing the application of the invention thereto.

Figure 1:
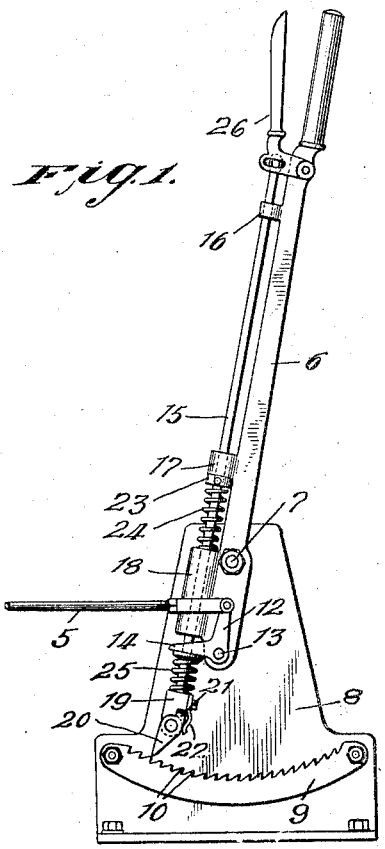

Referring to the drawings in detail, and especially to Figure 10, 1 designates the rear wheel of an automobile, having the usual brake drum 2 fixed thereto. 3 is the brake band, which is adapted to be drawn tightly about the drum 2, by a toggle mechanism 4, which may be of any usual construction. Power is applied to the toggle mechanism by means of suitable linkage, including a pull rod 5, which is arranged to be operated by the emergency brake lever 6. The latter is pivoted upon a pivot 7, carried by a suitable fulcrum support 8, which in many motor vehicles of present-day construction, forms a part of or is mounted upon the transmission gear casing of the vehicle. Obviously, the brake applying lever may be mounted in any suitable location or manner.

In the construction illustrated, the support 8 also carries a curved rack or segment 9, having ratchet teeth 10, formed thereon. Referring now more particularly to the specific construction illustrated in Figure 1, it will be seen that the pull rod 5 is not directly connected to the lever 6, as is the usual construction in ordinary brake mechanism. On the contrary, the pull rod 5 is pivoted to one arm 12 of a bell crank lever, which is pivoted at 13 to the lower end of the lever 6. The other arm 14 of the bell crank lever is used to actuate the pawl mechanism, the latter to operate with the teeth on the segment 9 when sufficient force is applied to the brake lever.

In the construction illustrated, this pawl mechanism is constructed as follows: A rod 15 is mounted parallel with the lever 6 and is arranged to slide in guides 16, 17 and 18, carried by the lever 6. This rod 15 has fixed to its lower end a block 19, to which is pivoted a pawl 20. The pawl 20 is provided with a shoulder 21, adapted to engage the block and limit the swinging movement of the pawl with respect to the block in one direction. A small spring 22 tends to hold this shoulder in engagement with this block but will yield to permit a limited pivotal movement of the pawl in one direction. The rod 15 has a collar 23 fixed thereto and a spring 24 interposed between this collar and upper end of the guide 18 tends to lift the rod 15 and the pawl 20, so as to normally hold the pawl 20 out of engagement with the teeth on the segment 9. A coil spring 25 somewhat stiffer than the spring 24 is interposed between the arm 14 of the bell crank and the block 19. Normally this spring is not under sufficient tension, however, to overcome the spring 24, so that until force is applied to the brake lever, the pawl 20 remains out of engagement with the teeth on the segment. Connected to the upper end of the rod 15 is a hand grip lever 26 of suitable construction adapted when moved toward the handle 6 in the usual manner to pull up on the rod 15 for the purpose of releasing the brake, as will be hereinafter explained.

When the brake is to be applied, the handle of the lever 6 is grasped and drawn toward the left. This will exert a pull upon the rod 5 and will draw up on the brake band and apply the brake. At first, however, the force of the spring 24 will be sufficient to hold the rod 15 and pawl 20 in raised position, so that the pawl will not catch on the segment and the brake cannot be locked in an applied position but the lever 6 will simply return to its initial position, if the pressure of the hand thereon is released. If, however, considerable force is applied to the lever 6, the pull of the pull rod acting upon the arm 12 of the bell crank lever will cause the arm 14 to push down on the stiff spring 25 with such force as to overcome the spring 24, and thereby force down the rod 15, block 19 and pawl 20, until the pawl 20 engages the teeth 10.

If the pressure of the hand on the brake lever be now released, the engagement of the pawl 20 with the teeth will hold the brake in firmly applied position. By properly proportioning the length of the bell crank lever arms and the strength of the spring 24, the pawl 20 may be made to engage the teeth 10 only after the application of sufficient force to the brake lever to apply the brake band so tightly that danger of accidental movement of the vehicle is entirely eliminated. Until this safe and sufficient pressure has been applied, the brake cannot be locked at all but will immediately be released upon the release of the pressure upon the brake lever. This entirely eliminates the danger of the application of insufficient braking force. The pivoted construction of the pawl described permits the pawl to ride freely over the teeth 10 after it has been brought down into contact therewith, if further application of the brake is desired. The pawl, however, will immediately take hold of any tooth as soon as the motion of the brake lever ceases. When it is desired to release the brake, the hand grip lever 26 is pressed towards the brake lever handle, thereby pulling up on the rod 5, block 19 and pawl 20, the spring 25 yielding so as to permit this to be done.

Figure 2:
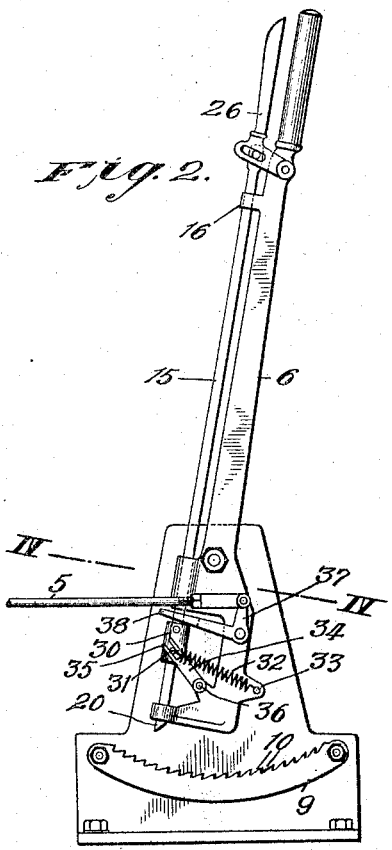
Figure 2 is a similar view showing a modified brake lever construction.
Figure 3:
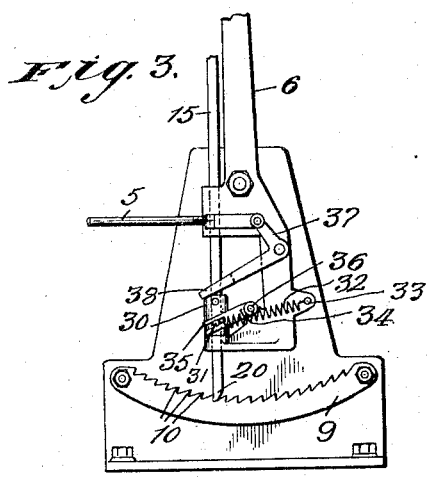
Figure 3 is a view showing the construction of Figure 2, after the application of the brake applying force.
Figure 4:
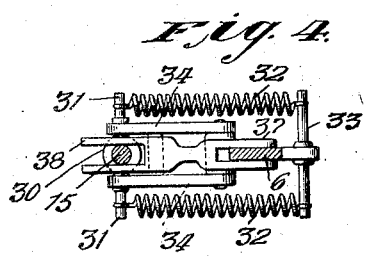
Figure 4 is a section on line IV—IV of Figure 2.

In Figures 2, 3 and 4, I have illustrated a modified construction for carrying out the invention, in which the lower end of the rod 15, which is slidingly mounted upon the lever 6, is formed to provide the pawl 20 for engagement with the teeth 10 on the segment 9. Fixed to the rod 15 is a block or enlargement 30 having pins 31 projecting from it, to which are attached a pair of strong coil springs 32. The other ends of the springs 32 are attached to a cross pin 33, carried by a projection on the lever 6. Also pivoted to the lever 6 are a pair of links 34, slotted near their free ends as indicated at 35 to receive the pins 31. The springs 32 and links 34 are so proportioned and arranged that when the rod 15 is in its upper position, as shown in Figure 2, the line connecting pins 31 and 33, which represents the line of tension of the springs 34, passes above the point of pivotal support 36 of the links 34. The springs 34 thus tend to hold the rod 15 raised and the pawl out of engagement with the teeth on the segment. If the rod 15, however, be forced downwardly, the pins 31 will move downwardly until the line of the springs 34 passes below the pivot point 36, when the tension of the springs 34 will serve to hold the rod 15 and pawl 20 depressed, so that the pawl will engage the segment teeth 10. The brake pull rod 5 is connected to one arm 37 of a bell crank lever, the other arm 38 of which is forked and engages the block 30 on the rod 15. Normally the rod will occupy its raised position as shown in Figure 2.

When sufficient pressure is applied to the brake lever 6, the pull on the bell crank lever will force the rod 15 downwardly, as shown in Figure 3. As soon as sufficient force has been applied to stretch the springs 34 to such an extent that the line of tension of the springs passes the dead center, as represented by the pivotal point 36, then the pawl 20 will snap quickly down into engagement with the segment teeth and the springs 34 will act to hold the pawl 20 firmly in engagement with the segment teeth, while at the same time permitting the pawl to snap over the teeth in the direction of further application of the brake. When it is desired to release the brake, manipulation of the hand grip lever 26 will lift the pawl out of engagement with the segment teeth, and upon relieving the pressure upon the brake lever, will restore the parts to the positions shown in Figure 2.

In Figures 5 and 6, I have shown another modification of the invention, in which the brake lever 6 has pivoted to its lower end, a lever 40 having an arm 41 to which the brake pull rod is attached. The lever 40 also has a hook-shaped pawl portion 42, adapted to engage the teeth on the segment 9. The lever 40 is normally held in such position that the pawl 42 is out of engagement with the teeth on the segment, the means for holding it in this position comprising a spring pressed, wedge-shaped plunger 43, mounted on the stem 44, slidable in guides on the lever 6. A spring 45 acts to urge the plunger 43 downwardly. The wedge-shaped plunger engages in a similarly shaped notch 46 in the curved upper surface of the lever 40. The engagement of the plunger with this notch prevents the movement of the lever 40, so as to bring the pawl 42 in engagement with the segment until sufficient force has been applied to the pull rod 5 to force the plunger out of the notch. The desired force may be determined by giving a proper inclination to the engaging surfaces of the plunger and notch, and by using a spring of requisite strength. When the plunger has once been forced out of the notch, it will ride on the curved surface of the lever. A spring 47 is preferably provided for holding the pawl 42 yieldingly in engagement with the teeth on the segment, although this is not essential as the pull of the brake upon the pull rod 5 also tends to keep the pawl in engagement with the segment teeth. For releasing the brake, a hand grip lever 26 is provided, which is arranged to pull upwardly a rod 15, which operates a bell crank lever 48, the depending arm of which engages a pin 49, projecting from the lever 40. By operating the bell crank lever 48, the lever 40 may be restored to the position shown in Figure 5, when the plunger 43 will snap back into the notch 46.

In Figures 7 and 8, another form of the invention is shown, in which the brake lever 6 has pivoted to its lower end, a lever member 50, to which is attached the brake pull rod 5 and which has a pawl portion 51, adapted to engage the teeth on the segment 9. A strong coil spring 52 is attached at its lower end to a pin 53, projecting from the lever 50, and at its upper end to a pin 54 projecting from the brake lever 6. Normally the axis of the spring passes to the left of the pivotal support 55 of the lever 50, so that the spring tends to hold the lever 50 in the position shown in Figure 7, with the pawl 51 out of engagement with the segment teeth. When sufficient pressure is applied to the braking lever, however, the force of the spring 52 will be overcome and the lever 50 will be swung about its pivot until the axis of the spring 52 passes the center of pivotal support 55 of the lever 50. The pawl 51 will then be brought into engagement with the segment and will be maintained in active position by the combined pull of the brake rod and of the spring 52. To release the brake and restore the lever member 50 to normal position, a hand grip lever 26 and rod 15 are employed.

In Figure 9, I have shown another modification of the invention, in which a lever member 60 is pivoted at 61 to the brake lever 6. Also pivoted to the member 60 are the brake pull rod 5 and the hand grip rod 15. The member 60 is provided with a pawl portion 62 adapted to engage the teeth upon the segment 9 when sufficient force is applied to the brake. A jack knife spring 63 is attached to the lever 6 and normally engages the flat surface 64 on the lever member 60, thereby holding the same in normal position with the pawl portion 62 out of engagement with the segment 9 until sufficient force has been applied to cause the spring 63 to yield. When the point 65 of the member 60 passes the dead center position, then the spring 63 will tend to hold the pawl portion 62 in engagement with the teeth on the segment.

It will be seen that the constructions above described provide means for locking the brake in applied position only after a predetermined force has been employed, so that the brake can only be locked on when it has been drawn sufficiently tight to positively prevent movement of the vehicle.

It will also be noted that most of the mechanisms described are of such character that when once the locking pawl has been brought into engagement with the segment, it will be caused to firmly engage therewith and that there is no danger of the pawl becoming accidentally displaced, so as to release the brake. For instance, with the construction shown in Figures 2, 3 and 4, the pawl is only applied after sufficient force has been utilized to swing the toggle mechanism, comprising the links 34 and springs 32, past the dead center. As soon as this has been done, however, springs 32 then tend to maintain the pawl in engagement with the segment, so that accidental displacement of the pawl is impossible and the brake is firmly locked on until the hand grip lever is actuated.

Another valuable feature of the construction shown is that in the case of weakening or breakage of the spring means utilized, the brake will not fail to work nor will the pawl mechanism be rendered inoperative in such a way as to prevent locking on of the brake. For instance, in the construction shown in Figures 2, 3 and 4, if the springs 32 should break, the brake could still be applied by manipulating the brake lever in the usual manner and the pawl would still engage the rack teeth and be held in engagement therewith by a pull of the rod 5. The only difference would be that the brake could be locked on at any point instead of only after the application of the predetermined pressure. The brake in fact would function exactly as brakes in use at present now function.

While I have shown and described in detail, certain preferred embodiments of my invention, I realize that the same may be embodied in other constructions, and I do not wish to limit myself to the particular means set forth. On the contrary, I intend to cover my invention broadly in whatever form its principle may be embodied.

Having thus described my invention, I claim:

1. The combination with a vehicle brake, of means for locking the brake in applied position and means sensitive to the amount of brake applying force for controlling the action of the said locking means.

2. The combination with a vehicle brake, of means for applying the same, and means for locking the same applied after the application of a predetermined applying force, said locking means being incapable of locking the brake in applied position until the application of said force.

3. The combination with a vehicle brake, of means for applying the same, and means for preventing the locking of the brake in applied position when applied with insufficient force to prevent accidental movement of the vehicle.

4. The combination with a vehicle brake, of a lever for applying the same, pawl and ratchet mechanism for locking said lever in brake applying position, and means for preventing the operation of said pawl and ratchet mechanism until predetermined force has been applied to the brake.

5. The combination with a vehicle brake, of a lever for applying the same, a pawl and ratchet mechanism for locking the brake lever in brake applying position, and yielding means depending upon the force applied to the brake for governing the operation of the pawl and ratchet mechanism.

6. The combination of a brake, means for applying the same, a yielding connection between said brake and said applying means adapted to yield upon the application of a brake applying force, and means normally held out of action by said yielding connection for locking the brake in applied position, said locking means coming into action only upon the yielding of said yielding connection.

7. The combination of a brake rod, a brake lever, brake locking means associated with said brake lever, a movable member connecting said brake rod and lever and operatively associated with the brake locking means and a spring arranged to oppose the movement of said movable member during application of said brake.

8. The combination of a brake rod, a brake lever, and brake locking means, said brake locking means including a movable member constituting a connection between the brake rod and the brake lever and yielding means arranged to resist the movement of said movable member during the initial part of the movement of the brake applying lever.

In testimony whereof I have affixed my signature to this specification.

EDMUND QUINCY MOSES.